March 29, 1932.    G. SCHNEIDER    1,851,732
TAPPET PRODUCTION METHOD
Filed July 7, 1930
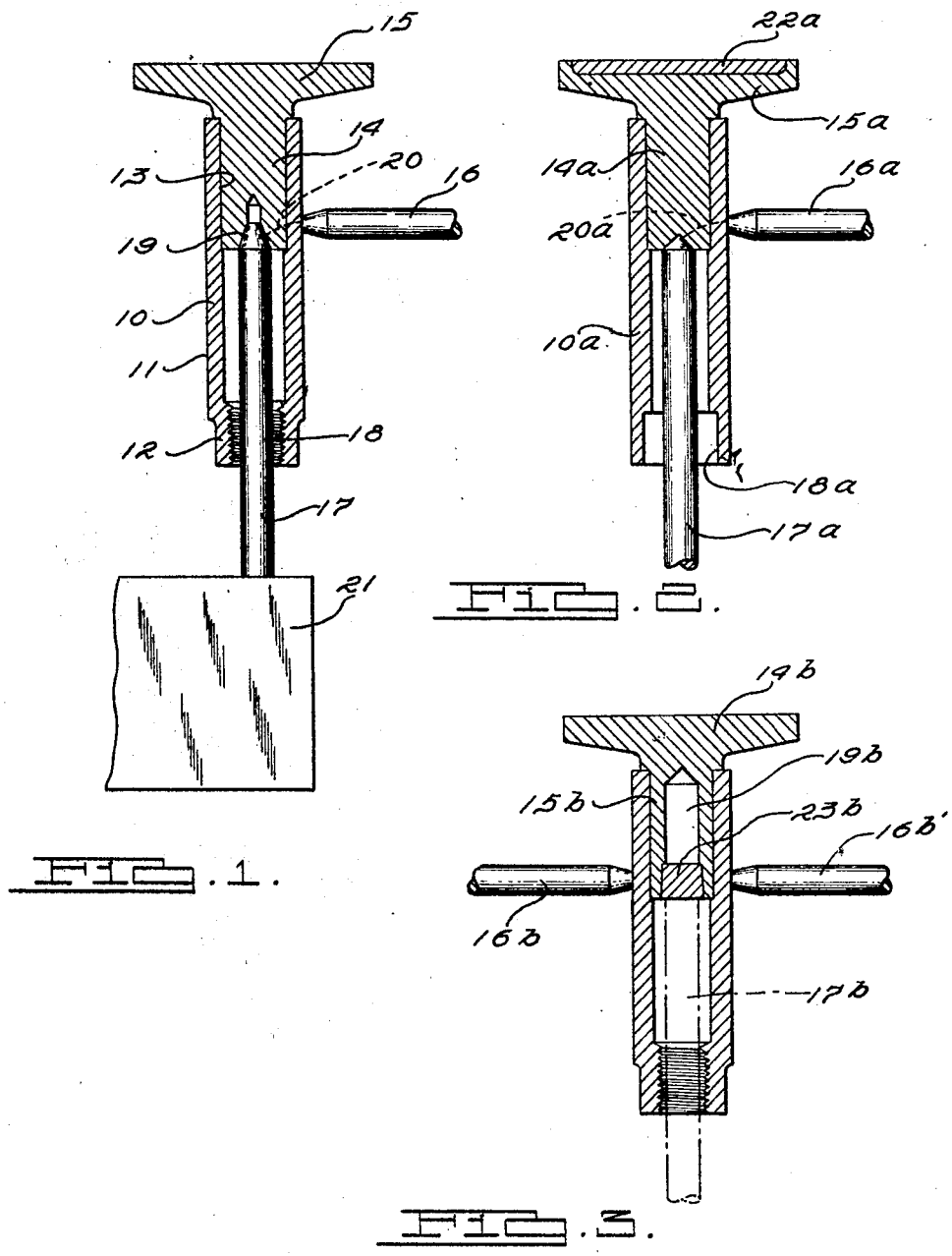
INVENTOR
George Schneider.
BY
ATTORNEYS.

Patented Mar. 29, 1932

1,851,732

UNITED STATES PATENT OFFICE

GEORGE SCHNEIDER, OF SAGINAW, MICHIGAN, ASSIGNOR TO WILCOX-RICH CORPORATION, A CORPORATION OF MICHIGAN

TAPPET PRODUCTION METHOD

Application filed July 7, 1930. Serial No. 466,113.

This is referred to as an invention in tappet production methods for the reason that, although undoubtedly capable of various alternative applications, the new method has been devised primarily with reference to the union of separately preformed tubular tappet bodies with tappet heads of any usual or preferred design or material,—said heads being formed integral with shanks whose dimensions adapt the same to interfit within said tubular bodies and to be retained therein by welding but whose composition is unfavorable to the application of usual spot-welding methods.

Spot-welding methods have been found suitable to the uniting of cast tappet heads with tubular bodies formed from steel; but efforts to unite steel heads with steel bodies of like or higher carbon content by usual spot-welding methods employing external electrodes have been found unsatisfactory. Either the imperfectly conductive contact between a shank and a tubular body or the low conductivity of the shank or the high melting point of the steel used therein, or a combination of these factors, is found to be unfavorable to a direct flow of current, adequate to the desired welding effect, through said shank,—in preference to the flow largely by way of the longer path or paths provided by the tubular body; and all forms of the present invention accordingly contemplate the provision of a concavity or other contact-engageable face on or in the inner end of the shank and the disposition thereon or insertion therein of a body of conductive metal, or material serving as an electrode or contact element. This body of conductive metal may either be a terminal portion of a copper electrode, momentarily applied for a local heating effect or it may be a plug of copper adapted to cooperate with an electrode or to serve as an intermediate electrode, as hereinafter described.

Although there are recognized advantages in the provision of cast iron faces upon tappet heads, steel heads are found to be more suitable for certain uses in view of the toughness requisite thereto; and the present invention has both the merit of permitting cast iron faces to be formed, as by puddling, upon steel heads not connected with bodies and also the merit of enabling any desired perfecting operations to be completed in advance of the union of the heads with tubular bodies,—so that few or none of the tappets need be rejected after a final union of heads to bodies; and, although the heads employed herein may be preformed in any desired manner, it is an object of the invention to obviate all necessity for casting operations.

Other objects of this invention, including the provision of steps which enable any thread-cutting or like operations to be performed upon the mentioned tubular bodies while the latter retain a configuration, without heads, favorable to their economical manipulation, may be best appreciated from an illustrative embodiment of the invention, taken in connection with the appended claims and the accompanying drawings.

Fig. 1 is a vertical section through an organization illustrative of the present invention but omitting structures that are immaterial to the principle thereof.

Fig. 2 is a similar view, illustrating an alternative embodiment.

Fig. 3 is a similar view of another alternative embodiment.

All of the mentioned views are essentially diagrammatic. Referring first to Fig. 1, a tubular body 10 is shown as having been preformed to include a substantially cylindrical exterior surface 11, an interiorly threaded reduced lower portion, and an upper portion providing a substantially cylindrical or slightly conical bore 13 adapted snugly to receive the shank 14 of a head 15. Although, in case said head is formed of cast iron and closely interfits therewith, a head having the illustrated configuration may advantageously be secured to a preformed body of the illustrated type by spot-welding effected by electrodes disposed on opposite sides of the body 10 at the level of the shank 14 in case the head 15 is preformed, as herein proposed (by cutting or by forging or other similar operations) from steel similar to or less readily conductive or less readily melted than the body 10, in order to avoid transmitting an undue proportion of the welding current through the body 10 by a semi-circular path or paths not including the shank 14, the present invention contemplates the use of an external electrode 16 conjointly with an internal electrode 17,—the latter being shown as inserted through the threaded opening 18 and as engaging a central concavity 19 in the lower end of the shank 14. This construction will be seen to assure a direct flow of current, by a short path such as that indicated by the dotted line 20, radially through the cylindrical walls of the body 10 and through an adjacent portion of the shank 14. Either or both of the illustrated electrodes may be cooled by means such as are suggested at 21 in connection with the electrode 17, and any suitable source of electrical energy may be used therewith,—the construction and mode of operation being such as to assure the desired heating and welding effect and to avoid "burning" the tubular body 10 or its equivalent.

It will be understood that the shank 10 and the cylindrical surface 13 are intended accurately to interfit; and that the described preformation of the body 10 and the head 15 from steels such as S. A. E. 1035 and S. A. E. 1010 not only is favorable to accuracy in the execution of all necessary steps and operations thereon but also tends to economy in that it substantially obviates necessity for rejection of any finished tappet; and Fig. 2 will be seen to suggest that, in order to obviate such rejections in case preformed heads are to be provided with cast iron faces (as shown at 22a, in connection with the head 15a, comprising a shank 14a) the suggested facing operation, and any desired grinding or finishing operations upon a face 22a, may be completed in advance of the union of the shank 14a with a body 10a,—as by means of electrodes or contact elements 16a and 17a. The contact element 17a is shown as inserted through a preformed counterbore 18a; but this showing is intended primarily to indicate that, as in the instance first described, any desired steps may be performed upon either the heads 15a or the bodies 10a in advance of the uniting of the same by a welding current passed radially through the shank 14a and the body 10a in a path such as that suggested by the dotted line 20a.

Reference characters being applied to Fig. 3 in the same general manner as to preceding figures but with a "b" added to each character, it will be noted that a so-called intermediate electrode is shown as seated in a comparatively deep concavity 19b in the shank 15b of a head 14b, and is adopted to cooperate with a plurality of external electrodes 16b, 16b'. The intermediate electrode 23b may advantageously be formed of copper, or other highly conductive material, preferably having a drive fit or otherwise provided with means for its retention in conductive engagement with comparatively thin shank walls surrounding the same,—the intent being to provide a highly conductive direct path between the external electrodes 16b and 16b'. This construction will be seen to resemble the constructions shown in Figs. 1 and 2 in that an interior electrode 17b may be used, if desired, in connection with either or both of the external electrodes 16b or 16b',—as also in that, whether the current flow is inward or outward or alternating, it always follows substantially radial lines through both a shank wall and a cylindrical body wall opposite the outer electrodes. Any incidental thermal expansion of the shank will be seen to favor a good conductive contact between said shank and the surrounding wall, and the prompt formation of a strong and permanent connection therebetween.

Although the foregoing description has included but a limited number of embodiments of the present invention, it will be understood not only that various features thereof might be independently employed but also that numerous modifications, additional to any referred to herein, might easily be devised by skilled workers, if informed of the foregoing,—all without the slightest departure from the spirit and scope of the present invention, as the latter is indicated above and in the following claims.

What I claim is:

1. In the production of articles such as valve tappets, a method which comprises: preforming an outer tubular body from steel; separately preforming an inner element having a shank to interfit with said tubular body, the lower end of said shank being formed to receive an electrode; inserting said shank in said body; disposing electrodes respectively in contact with said shank and said body; and passing an electric current radially through said shank and said body by means comprising said electrodes.

2. In the production of articles such as valve tappets a method which comprises: preforming an outer tubular body from steel; separately preforming an inner element having a shank to interfit with said tubular body, the lower end of said shank being shaped to receive an electrode; inserting said shank in said body; disposing an electrode internally in contact with said shank and said body; and passing an electric current through said shank and said body by means comprising said internal electrode.

3. In the production of articles such as valve tappets a method which comprises: preforming an outer tubular element from steel; separately preforming an inner element, the lower end of said shank being shaped to include a shank to interfit with said tubular element and to receive an electrode inserted therethrough; disposing an electrode internally in contact with said shank; and passing an electric current radially through said shank and said tubular element by means comprising said electrode and a plurality of external electrodes oppositely disposed with reference to said shank.

4. For use in the production of valve tappets: a steel head provided with a shank having therein a centrally disposed concavity positioned at its lower end to receive an electrode element.

5. In the production of articles such as valve tappets, a method which comprises: preforming an outer tubular body from steel; separately preforming an inner element having a shank to interfit with said tubular body, said shank having a centrally disposed concavity formed at its lower end to receive an electrode; inserting said shank in said body; disposing electrodes respectively in contact with said shank and said body; and passing an electric current radially through said shank and said body by means comprising said electrodes.

6. In the production of articles such as valve tappets a method which comprises; preforming an outer tubular body from steel; separately preforming an inner element having a shank to interfit with said tubular body, said shank having a centrally disposed concavity formed at its lower end to receive an electrode; inserting said shank in said body; disposing an electrode internally in contact with said shank and said body; and passing an electric current through said shank and said body by means comprising said internal electrode.

GEORGE SCHNEIDER.

CERTIFICATE OF CORRECTION.

Patent No. 1,851,732.  Granted March 29, 1932, to

GEORGE SCHNEIDER.

It is hereby certified that error appears in the printed specification of the above numbered patent requiring correction as follows: Page 2, lines 126 and 127, claim 3, strike out the words "the lower end of said shank being shaped", and line 127, same claim, after "element" strike out the word "and" and insert the words the lower end of said shank being shaped; and that the said Letters Patent should be read with these corrections therein that the same may conform to the record of the case in the Patent Office.

Signed and sealed this 17th day of May, A. D. 1932.

(Seal)

M. J. Moore,
Acting Commissioner of Patents.